US012580682B2

(12) United States Patent
Selvidge et al.

(10) Patent No.: US 12,580,682 B2
(45) Date of Patent: Mar. 17, 2026

(54) ROLLBACK FOR COMMUNICATION LINK ERROR RECOVERY IN EMULATION

(71) Applicant: Siemens Industry Software Inc., Plano, TX (US)

(72) Inventors: Charles W. Selvidge, Oakland, CA (US); Jean-Paul Clavequin, Sevres (FR); Jean-Marc Brault, Guyancourt (FR); Laurent Vuillemin, Montigny le Bretonneux (FR)

(73) Assignee: Siemens Industry Software Inc., Plano, TX (US)

( * ) Notice: Subject to any disclaimer, the term of this patent is extended or adjusted under 35 U.S.C. 154(b) by 949 days.

(21) Appl. No.: 17/754,320

(22) PCT Filed: Oct. 10, 2019

(86) PCT No.: PCT/US2019/055612
§ 371 (c)(1),
(2) Date: Mar. 30, 2022

(87) PCT Pub. No.: WO2021/071495
PCT Pub. Date: Apr. 15, 2021

(65) Prior Publication Data
US 2022/0329351 A1      Oct. 13, 2022

(51) Int. Cl.
*H04L 1/00*          (2006.01)
*G06F 11/14*        (2006.01)
(Continued)

(52) U.S. Cl.
CPC ........ *H04L 1/0072* (2013.01); *G06F 11/1405* (2013.01); *G06F 30/33* (2020.01); *G06F 2117/02* (2020.01)

(58) Field of Classification Search
CPC .... H04L 1/0072; G06F 11/1405; G06F 30/33; G06F 2117/02; G06F 30/331
See application file for complete search history.

(56) References Cited

U.S. PATENT DOCUMENTS 10,410,713 B1 *   9/2019   Selvidge ............. G11C 7/1006
10,579,776 B1 *   3/2020   Selvidge ............. G06F 30/331
(Continued)

FOREIGN PATENT DOCUMENTS

CN        109215728 A      1/2019

OTHER PUBLICATIONS

PCT International Search Report and Written Opinion of International Searching Authority mailed Jul. 3, 2020 corresponding to PCT International Application No. PCT/US2019/055612 filed Oct. 10, 2019.
(Continued)

*Primary Examiner* — Albert Decady
*Assistant Examiner* — Osman M Alshack

(57) ABSTRACT

Each of a plurality of reconfigurable hardware modeling circuits in a reconfigurable hardware modeling device comprises: a plurality of communication ports; error monitoring circuitry configured to monitor, while the reconfigurable hardware modeling device is performing an operation for verifying a circuit design, whether data received from the plurality of communication ports contain an error or not, and send out an error signal indicating the monitoring result; and rollback circuitry configured to, if data received by any of the plurality of reconfigurable hardware modeling circuits contain an error, enable the reconfigurable hardware modeling circuit to repeat the operation from a state before the error is received, and if data received by the plurality of reconfigurable hardware modeling circuits contain no error, allow the reconfigurable hardware modeling circuit to continue the operation.

14 Claims, 9 Drawing Sheets

Flow chart 900

(51) Int. Cl.
   G06F 30/33          (2020.01)
   G06F 117/02         (2020.01)

(56)                    References Cited

U.S. PATENT DOCUMENTS

| | | | |
|---|---|---|---|
| 2003/0182641 | A1 | 9/2003 | Yang |
| 2009/0150136 | A1* | 6/2009 | Yang ........................ G06F 30/33<br>703/13 |
| 2011/0184713 | A1* | 7/2011 | Yang ........................ G06F 30/33<br>703/13 |
| 2014/0095841 | A1* | 4/2014 | Doi ........................ G06F 9/3016<br>712/220 |
| 2018/0113976 | A1* | 4/2018 | Suresh ................ G06F 11/2733 |
| 2018/0115395 | A1* | 4/2018 | Jung ..................... H04L 1/1812 |
| 2018/0205495 | A1* | 7/2018 | Maeda .................. G06F 3/0659 |
| 2018/0285484 | A1* | 10/2018 | Bhattacharya ........ G06F 30/331 |
| 2018/0300440 | A1* | 10/2018 | Ali ......................... G06F 40/143 |
| 2019/0087522 | A1* | 3/2019 | Mohamed .............. G06F 11/25 |
| 2019/0254029 | A1* | 8/2019 | Li ......................... H04L 5/0078 |

OTHER PUBLICATIONS

David Donofrio et al: "Energy-Efficient Computing for Extreme-Scale Science", Computer, IEEE Computer Society, Nov. 1, 2009, vol. 42, No. 11, pp. 62-71, DOI: 10.1109/MC.2009.353 the whole document p. 68, col. 2, paragraph 2-p. 69, col. 1, paragraph 1, USA.

\* cited by examiner

Host Workstation
110

190

Emulation Circuit Board

Emulation Circuit Board

Emulation Circuit Board

130

130

130

Emulation Circuit Board

Emulation Circuit Board

Emulation Circuit Board

Emulator 120

Target

Target

Target

180

180

180

Emulation Devices
140

Interconnect system
150

Programming system
160

Debug system
170

130

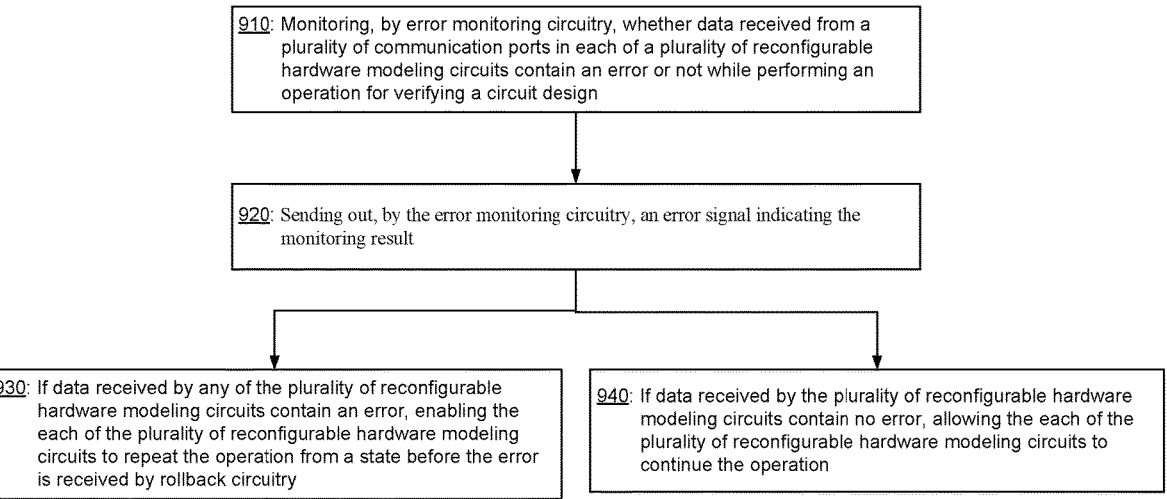

910: Monitoring, by error monitoring circuitry, whether data received from a plurality of communication ports in each of a plurality of reconfigurable hardware modeling circuits contain an error or not while performing an operation for verifying a circuit design 920: Sending out, by the error monitoring circuitry, an error signal indicating the monitoring result 930: If data received by any of the plurality of reconfigurable hardware modeling circuits contain an error, enabling the each of the plurality of reconfigurable hardware modeling circuits to repeat the operation from a state before the error is received by rollback circuitry 940: If data received by the plurality of reconfigurable hardware modeling circuits contain no error, allowing the each of the plurality of reconfigurable hardware modeling circuits to continue the operation Flow chart 900

FIG. 9

ROLLBACK FOR COMMUNICATION LINK ERROR RECOVERY IN EMULATION

FIELD OF THE DISCLOSED TECHNOLOGY

The present disclosed technology relates to the field of circuit design verification. Various implementations of the disclosed technology may be particularly useful for recovering from communication link errors in a reconfigurable hardware modeling device.

BACKGROUND OF THE DISCLOSED TECHNOLOGY

Electronic circuits, such as integrated circuits, are used in a variety of products, from automobiles to smart phones to personal computers. Designing and fabricating these circuit devices typically involves many steps, known as a "design flow." The particular steps of a design flow often are dependent upon the type of integrated circuit being designed, its complexity, the design team, and the integrated circuit fabricator or foundry that will manufacture the circuit. Typically, software and hardware "tools" will verify a design at various stages of the design flow by running software simulators and/or hardware emulators/prototyping devices. The verification processes then are used to identify and correct errors in the design.

Several steps are common to most design flows. Typically, the specification for the new circuit initially is described at a very abstract level as a logical design. An example of this type of abstract description is a register transfer level (RTL) description of the circuit. With this type of description, the circuit is defined in terms of both the exchange of signals between hardware registers and the logical operations that are performed on those signals. A register transfer level design typically employs a Hardware Description Language (HDL) (sometimes also referred to as hardware design language or hardware definition language), such as the Very high speed integrated circuit Hardware Description Language (VHDL) or the Verilog language. The logic of the circuit is then analyzed, to confirm that the logic incorporated into the design will accurately perform the functions desired for the circuit. This analysis is sometimes referred to as "functional verification."

Logic simulation is a tool used for functional verification. Designing hardware today involves writing a program in the hardware description language. A simulation may be performed by running that program on a computer. Such an electronic design simulator can determine what the various states of an electronic design would be when presented with some input stimulus. Simulators are commercially available such as the QUESTA family of simulators from Mentor Graphics Corporations of Wilsonville, Oregon Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel as the circuit design will execute in a real device. By contrast, a simulator performs circuit verification by executing the hardware description code serially. The different styles of execution can lead to orders of magnitude differences in execution time. Examples of hardware emulators include the VELOCE family of emulators available from Mentor Graphics Corporation of Wilsonville, Oregon, the ZEBU family of emulators available from Synopsys, Inc. of Mountain View, California, and the PALLADIUM family of emulators available from Cadence Design Systems of San Jose, California As discussed in detail below, a reconfigurable hardware modeling device is typically constructed by connecting a large number of homogenous or heterogeneous reconfigurable hardware modeling circuits. Each of these reconfigurable hardware modeling circuits can be programmed to model some portion of an integrated circuit design. A value generated within one reconfigurable hardware modeling circuit is often needed by another reconfigurable hardware modeling circuit for further computation. As such, a data signal must be transmitted from the generating circuit to the further computing circuit.

Considering a large number of signals transmitted in and out of a reconfigurable hardware modeling circuit and a limited number of pins (ports) available for the transmission, high bandwidth interconnect mechanisms are desired to help speed up a design verification process. Modern integrated circuit communication technologies such as those used with SERDES (Serializer/Deserializer) transceivers allow for transmission of data on a single differential link at rates ranging from several Gbit/s up to more than 100 Gbit/s. These technologies, however, inherently produce random data errors on a very small fraction of the data bits transferred. Rates of data errors are referred to as Bit Error Rates, commonly abbreviated as BER. A link with a nominal BER of $10^{-12}$ produces an average of 1 incorrect bit for every $10^{12}$ bits transmitted. Observed BER values may range from as high as $10^{-9}$ or more with relatively unsophisticated silicon and system design practices to as low as $10^{-15}$ or less with sophisticated and correspondingly expensive practices. Nevertheless, it is technologically infeasible to have perfect transmission.

A communication link with a BER of $10^{-5}$ operating at a frequency of 10 Gbit/sec ($10^{10}$ bits per second) can be expected to have an error roughly once every $10^5$ seconds. This is a little bit less than once per day. A reconfigurable hardware modeling circuit can have 100 such links. A large reconfigurable hardware modeling device with 1,000 such reconfigurable hardware modeling circuits and thus 100,000 such links will typically have at least 1 error every second. Higher BER links will have errors even more often. Moreover, an emulator is often used to perform modeling computations corresponding to some type of real usage of a modeled integrated circuit device. For an emulator to model a system-on-circuit which is used in a mobile device, for example, it may be useful to boot an operating system such as Android and then run some type of application software. While the process can consume several minutes of time on a real device operating at full speed, the same process may take many hours or even days to complete on an emulator because it runs more slowly than real devices by a factor of 100 to 1000. Given the expected rate of errors and the need to perform computations that take hours, a reconfigurable hardware modeling device needs to employ a mechanism to detect and correct errors in communication.

A common approach for managing errors on communication links is to use error correction codes (ECCs). When using ECC, data on a transmission link are broken into blocks of data with some fixed size, D. A computation is performed based on the D bits of data often using polynomial arithmetic to compute E additional bits and the combined information of D data bits plus E ECC bits is sent across the link. A related computation is performed on the reception side using the D+E bits received. This computation can recognize and if desired correct certain classes of errors in the combined D+E bits to provide a correct value. Techniques with further complexity such as Forward Error Correction (FEC) can give more robust results in the face of multiple sequential errors within the data stream.

A consequence of error correction via ECC is that latency is added to the transmission process. Data cannot be safely used on the receiving side to perform a functional computation until the detection/correction computation has occurred. Further, extra bits are added into the transmission data, E extra bits for every D data bits. Both of the extra bit transmission and the detection/correction computation add multiple time overheads, increasing the latency of data transmission from the producing circuit to the consuming circuit. This latency is tolerable for data communications networks because the inherent transmission latency may already be long, such as in long-distance data communication. However, it can be a serious problem for a large emulator because data is often computed on one circuit (an FPGA or a Boolean processor), transmitted to another device in the same emulator for a subsequent computation, and such an operation can potentially repeat multiple times. The repeated delays can significantly slow down the verification process running on the emulator.

Another known technique for error recovery on transmission links involves the use of retransmission. In this type of conventional techniques, there is a higher level protocol between the two sides of the communication by which the receiver notifies the transmitter that some data has been corrupted in transmission or that correct data has been received. The transmission side stores data until it receives a corresponding notification from the receive side. If the transmission side is notified that data is correct it can delete the stored copy. If the data are invalid it resends it. This type of protocol, typically used in very loosely coupled networks, such as Ethernet, may incur a modest latency cost in the absence of errors but the correction process is very slow. Moreover, the level of data storage at a link would be high. Furthermore, an invalid data coming on one link, if not immediately corrected, can lead to wrong computations and correspondingly wrong data on other links in a reconfigurable hardware modeling device.

BRIEF SUMMARY OF THE DISCLOSED TECHNOLOGY

Various aspects of the present disclosed technology relate to techniques for communication link error recovery via rollback. In one aspect, there is a reconfigurable hardware modeling device comprising: a plurality of reconfigurable hardware modeling circuits, each of the plurality of reconfigurable hardware modeling circuits comprising: a plurality of communication ports, error monitoring circuitry configured to monitor, while the reconfigurable hardware modeling device is performing an operation for verifying a circuit design, whether data received from the plurality of communication ports contain an error or not, and send out an error signal indicating the monitoring result, and rollback circuitry configured to, if data received by any of the plurality of reconfigurable hardware modeling circuits contain an error, enable the each of the plurality of reconfigurable hardware modeling circuits to repeat the operation from a state before the error is received, and if data received by the plurality of reconfigurable hardware modeling circuits contain no error, allow the each of the plurality of reconfigurable hardware modeling circuits to continue the operation.

The reconfigurable hardware modeling device may be configured to generate, based on the error signal, a global error signal indicating whether data received by any of the plurality of reconfigurable hardware modeling circuits contain an error or not, and to broadcast the global error signal to each of the plurality of reconfigurable hardware modeling circuits for the error recovery circuitry.

The reconfigurable hardware modeling device may be a processor-based emulator, and the plurality of reconfigurable hardware modeling circuits are Boolean processor circuits. Alternatively, the reconfigurable hardware modeling device may be an FPGA-based emulator, and the plurality of reconfigurable hardware modeling circuits may be commercial FPGA chips or custom-designed FPGA chips.

The enabling operation performed by the rollback circuitry may comprise: suppressing state update of a state element. Alternatively, the rollback circuit may comprise storage elements for state elements in the each of the plurality of reconfigurable hardware modeling circuits configured to capture and store values currently stored in the state elements before the state elements perform state updating, and the enabling operation performed by the rollback circuitry comprises: transferring the value in the storage elements back to the state elements.

The monitoring operation performed by the error monitoring circuitry may comprise: determining, within one design clock cycle, whether data received from the plurality of communication ports at a rising edge, a falling edge, or both of the rising and falling edges of a design clock cycle immediately preceding the one design clock cycle contain an error or not, and generating the error signal within the one design clock cycle. The repeating operation may roll the operation for verifying the circuit design back to the rising edge of the design clock cycle immediately preceding the one design clock cycle.

A memory in each of the plurality of reconfigurable hardware modeling circuits may have a write buffer configured to store data to be written in the memory along with an intended address of the memory. The write buffer may be further configured to discard the data to be written in the memory along with the intended address of the memory if the data received by any of the plurality of reconfigurable hardware modeling circuits contain an error.

In another aspect, there is a method comprising: monitoring, by error monitoring circuitry in each of a plurality of reconfigurable hardware modeling circuits in a reconfigurable hardware modeling device, whether data received from a plurality of communication ports in the each of the plurality of reconfigurable hardware modeling circuits contain an error or not while the reconfigurable hardware modeling device is performing an operation for verifying a circuit design; sending out, by the error monitoring circuitry, an error signal indicating the monitoring result; if data received by any of the plurality of reconfigurable hardware modeling circuits contain an error, enabling the each of the plurality of reconfigurable hardware modeling circuits by rollback circuitry in the each of the plurality of reconfigurable hardware modeling circuits to repeat the operation from a state before the error is received; and if data received by the plurality of reconfigurable hardware modeling circuits contain no error, continuing the operation by the reconfigurable hardware modeling device.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 9 illustrates a flowchart showing a process of communication link error recovery via rollback that may be implemented according to various examples of the disclosed technology.

DETAILED DESCRIPTION OF THE DISCLOSED TECHNOLOGY

General Considerations

Figure 1A:
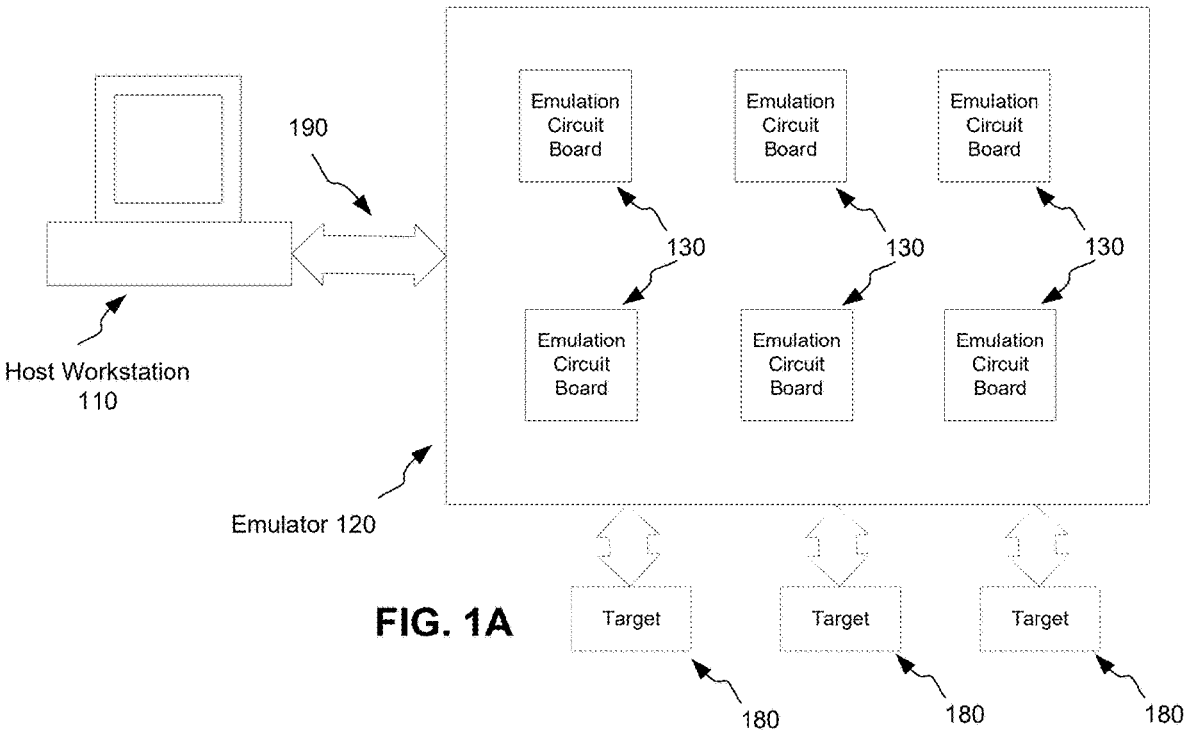
FIG. 1A shows an illustrative example of an emulation system with an emulator being coupled to targets.

Various aspects of the present disclosed technology relate to techniques for communication link error recovery via rollback. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "couple", "enable" and "monitor" to describe the disclosed methods/systems. Such terms are high-level descriptions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Hardware Modeling Environment

Reconfigurable hardware modeling devices can be emulators or prototyping devices. Two types of emulators have been developed. The first type is FPGA-based. In an FPGA-based architecture, each FPGA chip (reconfigurable hardware modeling circuit) has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route are performed on the FPGA chips in a way that preserves the connectivity in the original circuit design.

The programmable logic chips (reconfigurable hardware modeling circuits) employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that assumes 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors (reconfigurable hardware modeling circuits) able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modelled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench and the design-under-test, speeding up the execution of the testbench. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

In some embodiments, the disclosed technology may be implemented as part of a hardware emulation environment, such as the one illustrated in FIG. 1A. As seen in this figure, the hardware emulation environment includes an emulator 120 coupled to a host computer or workstation 110. The workstation 110 may be implemented by one or more computing systems. One computing system may include a single computer or multiple computers (e.g., a master computer and a plurality of slave computers). The workstation provides the capability to load the DUV (design-under-verification, also referred to as DUT—design under test) model into the emulator, controls the execution of the DUV model on the emulator over time, and serves as a debugging interface into the DUV model on the emulator. As discussed previously, the workstation may include the testbench and perhaps other software models in some of the operational modes.

The emulator 120 includes multiple printed circuit boards (emulation circuit boards) 130. These emulation circuit boards 130 are networked (not shown). A circuit design may be partitioned by the workstation 110 and loaded to the emulation circuit boards 130 for emulation.

In the in-circuit emulation mode, one or more targets 180 may be coupled to the emulator 120 as shown in FIG. 1A. In some simple environments, a target may be a piece of test equipment that generates and verifies test data such as a network tester. In other environments, the target can be the actual circuitry with which the DUT model will interact in its final application (e.g., other hardware components of the system for which the DUT model is designed). A target can be either a static target or a dynamic target, depending on whether design clock signals run in the emulator can be suspended or not.

Figure 1B:
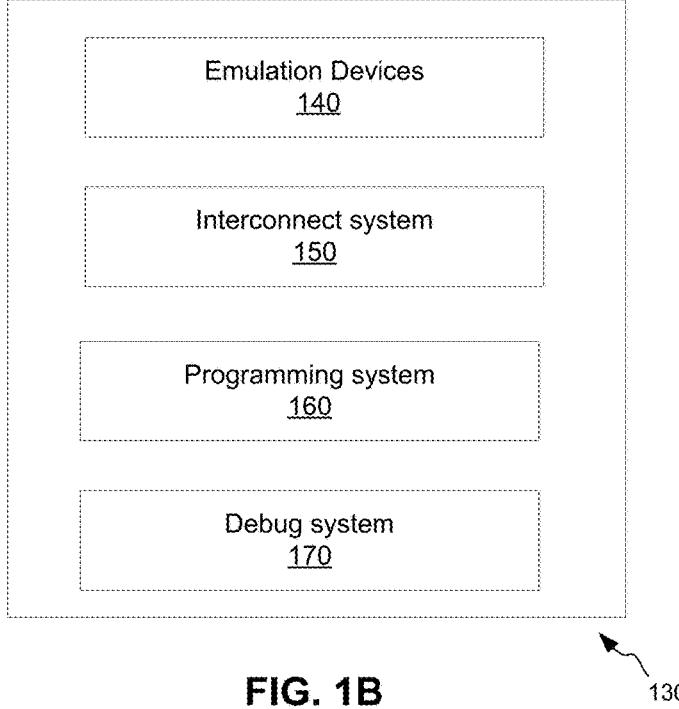
FIG. 1B shows an illustrative example of an emulation circuit board.

FIG. 1B illustrates an example of an emulation circuit board 130. The emulation circuit board 130 includes an array of emulation devices 140 (reconfigurable hardware modeling circuits). The emulation devices 140 can be programmed to model, for example, combinatorial logic components, sequential circuit components and memories. The emulation devices 140 may be processor-based or FPGA-based.

Also included in the emulation circuit board 130 are a configurable interconnect system 150, a programming system 160, and a debug system 170. A portion of a circuit design on one emulation device may need data computed by another portion of the design on another emulation device. The configurable interconnect system 150 allows data to be moved between emulation devices 140. In some implementations, the configurable interconnect system 150 may include a cross-bar device, a multiplexer, some other configurable network, or any combination thereof.

The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140.

The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model (e.g., FPGA configuration bitstreams), initial contents of registers and design memories and data for debugging purposes. This interface is independent of design-under-test and may comprise dedicated logic or programmed logic in the emulator.

The interface system may also comprise one or more transaction-level interfaces. These interfaces may be optimized for small packets of data and fast streaming speed. The speed may be, for example, in the order of 2-3 Gigabits per second. The communication is performed through transactors as discussed previously. A transactor includes a back-end bus-functional model-instrumented logic in the emulator model, which requires the emulator infrastructure clock keep running even though the design clocks can be stopped.

It should also be appreciated that the emulation system in FIG. 1A and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures.

Illustrative Computer-Based Operating Environment

Figure 2:
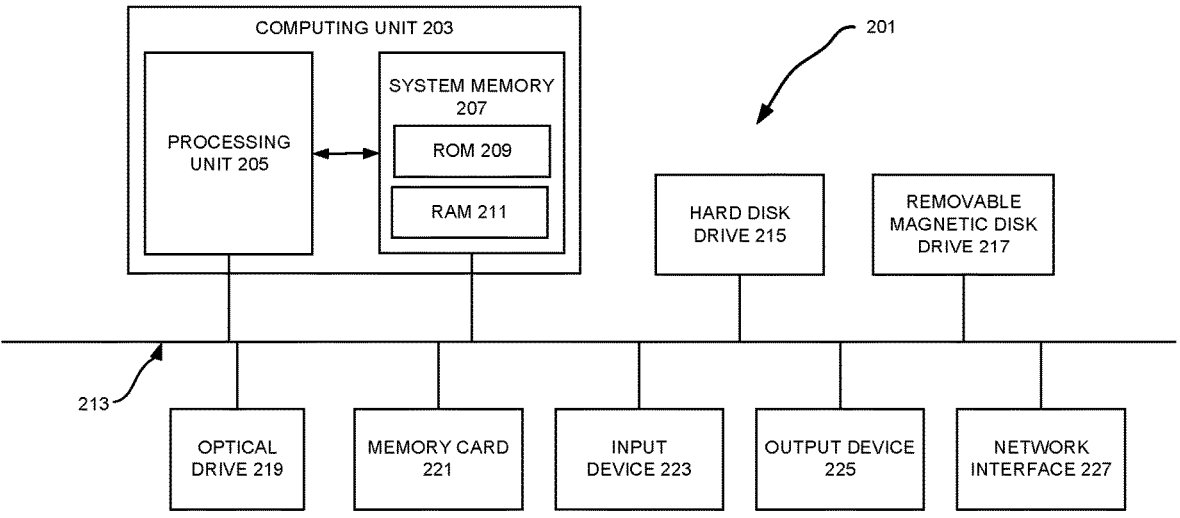
FIG. 2 illustrates a programmable computer system which various embodiments of the disclosed technology may employ.

FIG. 2 shows an illustrative example of a computing device 201 which may serve as the workstation 110 and/or implement various embodiments of a part or whole of the disclosed technology. As seen in this figure, the computing device 201 includes a computing unit 203 with a processing unit 205 and a system memory 207. The processing unit 205 may be any type of programmable electronic device for executing software instructions, but will conventionally be a microprocessor. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure, to one or more peripheral devices. For example, the processing unit 205 or the system memory 207 may be directly or indirectly connected to one or more additional memory storage devices, such as a "hard" magnetic disk drive 215, a removable magnetic disk drive 217, an optical disk drive 219, or a flash memory card 221. The processing unit 205 and the system memory 207 also may be directly or indirectly connected to one or more input devices 223 and one or more output devices 225. The input devices 223 may include, for example, a keyboard, a pointing device (such as a mouse, touchpad, stylus, trackball, or joystick), a scanner, a camera, and a microphone. The output devices 225 may include, for example, a monitor display, a printer and speakers. With various examples of the computer 201, one or more of the peripheral devices 215-225 may be internally housed with the computing unit 203. Alternately, one or more of the peripheral devices 215-225 may be external to the housing for the computing unit 203 and connected to the bus 213 through, for example, a Universal Serial Bus (USB) connection.

With some implementations, the computing unit 203 may be directly or indirectly connected to one or more network interfaces 227 for communicating with other devices making up a network. The network interface 227 translates data and control signals from the computing unit 203 into network messages according to one or more communication protocols, such as the transmission control protocol (TCP) and the Internet protocol (IP). Also, the interface 227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 201 is illustrated as an example only, and is not intended to be limiting. Various embodiments of the disclosed technology may be implemented using one or more computing devices that include the components of the computer 201 illustrated in FIG. 2, which include only a subset of the components illustrated in FIG. 2, or which include an alternate combination of components, including components that are not shown in FIG. 2. For example, various embodiments of the disclosed technology may be implemented using a multi-processor computer, a plurality of single and/or multiprocessor computers arranged into a network, or some combination of both.

Selective Suppression of State Updating for Speeding Up Verification

Figure 3:
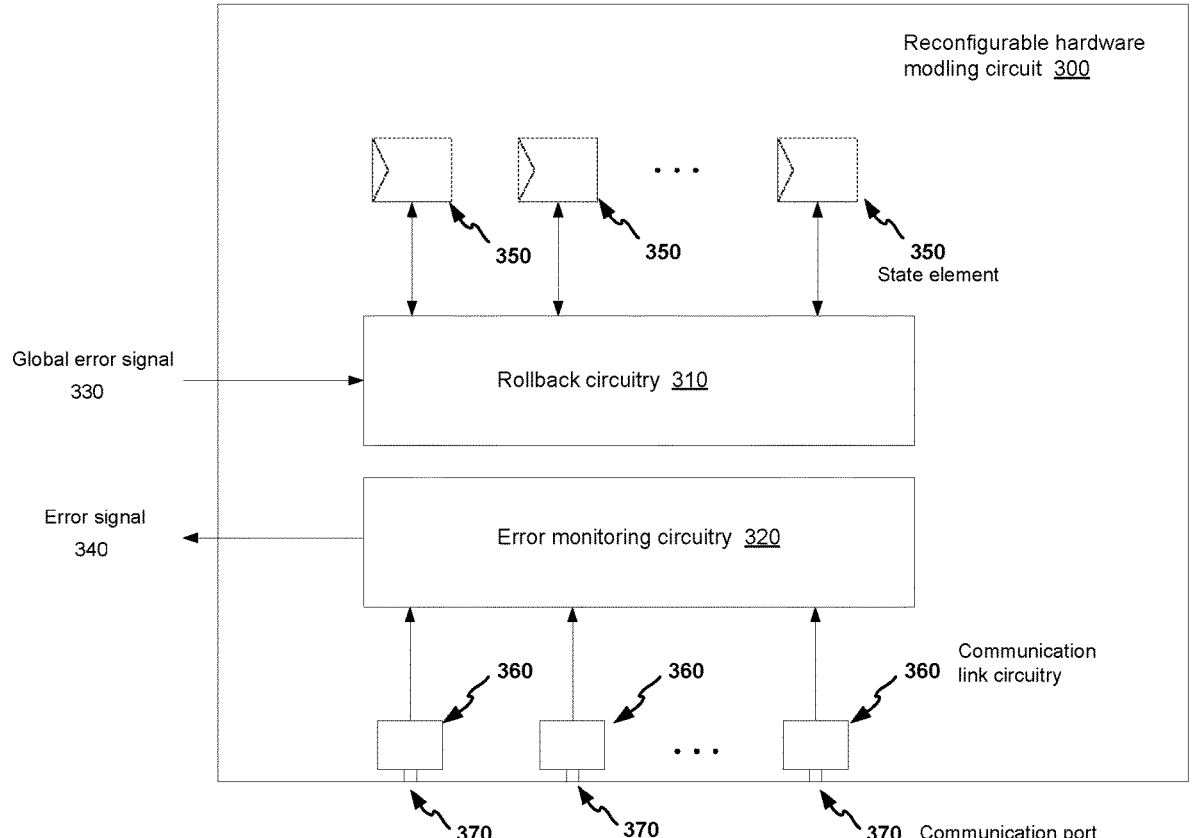
FIG. 3 illustrates an example of a reconfigurable hardware modeling circuit according to various embodiments of the disclosed technology.

FIG. 3 illustrates an example of a reconfigurable hardware modeling circuit 300 according to various embodiments of the disclosed technology. The reconfigurable hardware modeling circuit 300 represents one of the reconfigurable hardware modeling circuits in a reconfigurable hardware modeling device. The reconfigurable hardware modeling circuit 300 can be a Boolean processor circuit, a commercial FPGA chip, or a custom-designed FPGA chip. The reconfigurable hardware modeling device can be an emulator or a prototyping device.

The reconfigurable hardware modeling circuit 300 comprises a plurality of communication ports 370, error monitoring circuitry 320 and rollback circuitry 310. The plurality of communication ports 370 is coupled to communication link circuitry 360. The communication link circuitry 360 is configured to process input/output signals for data transmission between the reconfigurable hardware modeling circuit 300 and another reconfigurable hardware modeling circuit or a different circuit in the reconfigurable hardware modeling device. The communication link circuitry 360 may be a Serializer/Deserializer (SerDes), for example. A Serializer/Deserializer can be configured to serialize a parallel bus input along with data address & control signals and send the serialized stream along with a reference clock.

The error monitoring circuitry 320 is configured to monitor whether data received from the plurality of communication ports contain an error or not, and send out an error signal 340 indicating the monitoring result. The monitoring can be performed while the reconfigurable hardware modeling device is performing an operation for verifying a circuit design. The error detection may be based on parity checking, checksum, cyclic redundancy check, or other mechanisms.

The rollback circuitry 310 is coupled to state elements 350 in the reconfigurable hardware modeling circuit 300. A state element is a circuit component that is capable of storing a value. State elements can be used to control the flow of signals between combination logic circuits. A state element can be triggered to replace the stored value with the value present at its input. This process is referred to as state updating. A particular edge or level of a clock input signal for the state element, for example, can serve as the trigger for the state element to perform state updating. Examples of state elements include latches and flip-flops. The rollback circuitry 310 is configured to, if data received by any of the reconfigurable hardware modeling circuits in the reconfigurable hardware modeling device contain an error, enable the reconfigurable hardware modeling circuit 300 to repeat the operation from a state before the error is received, and if data received by the plurality of reconfigurable hardware modeling circuits contain no error, allow the reconfigurable hardware modeling circuit 300 to continue the operation.

The reconfigurable hardware modeling device may be configured to generate, based on the error signal 340 along with error signals sent by the other reconfigurable hardware modeling circuits, a global error signal 330 indicating whether data received by any of the reconfigurable hardware modeling circuits contain an error or not, and to broadcast the global error signal 330 to each of the reconfigurable hardware modeling circuits including the reconfigurable hardware modeling circuit 300. The rollback circuitry 310 can use the received global error signal 330 to either roll back the operation to correct the error or allow the operation to continue.

It should be noted that the figure is for illustration only. The sizes of the components of the reconfigurable hardware modeling circuit 300 shown in the figure are not to scale and also do not reflect their relative sizes. The arrow lines shown in the figure does not represent physical wires but direct/indirect signal couplings through one or more paths between the components or between a component and an outside circuit. The double-arrow lines between the rollback circuitry 310 and the state elements 350 can be single-arrow lines according to some embodiments of the disclosed technology. Moreover, many other components of the reconfigurable hardware modeling circuit 300 are not shown in the figure.

According to some embodiments of the disclosed technology, the error monitoring circuitry 320 can perform the error check within the emulation cycle (also referred to as design clock cycle or user clock cycle) when the data are delivered. The rollback circuitry 310 enables state update suppression at the next design clock cycle if any of the reconfigurable hardware modeling circuits in the reconfigurable hardware modeling device detects an error. State update suppression means the state elements 350 are not allowed to perform state update and the stored contents will be kept. In effect, the reconfigurable hardware modeling device repeats the operation at the next design clock cycle, retransmitting the desired data. If none of the reconfigurable hardware modeling circuits detects an error, the rollback circuitry 310 does not enable state update suppression at the next design clock cycle, allowing the reconfigurable hardware modeling device to continue the operation to a subsequent state.

Circuit designs typically have some state elements changing their states on rising clock edges and others changing on falling clock edges. An error can occur on either edge, so the error monitoring circuitry 320 can be configured to do the error check for data received at both edges. If an error is detected at a clock edge by any of the reconfigurable hardware modeling circuits in the reconfigurable hardware modeling device, the rollback circuitry 310 can be configured to suppress state updating for the two clock edges immediately following the clock edge.

The process of taking the error signals from the reconfigurable hardware modeling circuits to compute a global error signal 330 is sometimes called a global reduction operation. The process of sending the global error signal 330 to each of the reconfigurable hardware modeling circuits is sometimes called a global broadcast operation. These two processes can be relatively slow. The duration of the design clock cycle may need to be increased for this type of error correction approaches.

According to some other embodiments of the disclosed technology, the error monitoring circuitry 320 can perform the error check within the emulation cycle (also referred to as design clock cycle or user clock cycle) when the data are delivered. The rollback circuitry 310, however, employs a storage element for each of the state elements 350 to keep a value currently stored for a potential rollback. This allows the state elements 350 to be updated to a next state without waiting for the global reduction operation and the global broadcast operation to be finished within the original design clock cycle. If the error monitoring circuitry 320 detects an error in any of the reconfigurable hardware modeling circuits, the rollback circuitry 310 will transfer the value in the storage elements back to the corresponding state elements 350. As a result, the operation will be repeated in the subsequent design clock cycle and the desired data will be retransmitted.

Figure 4:
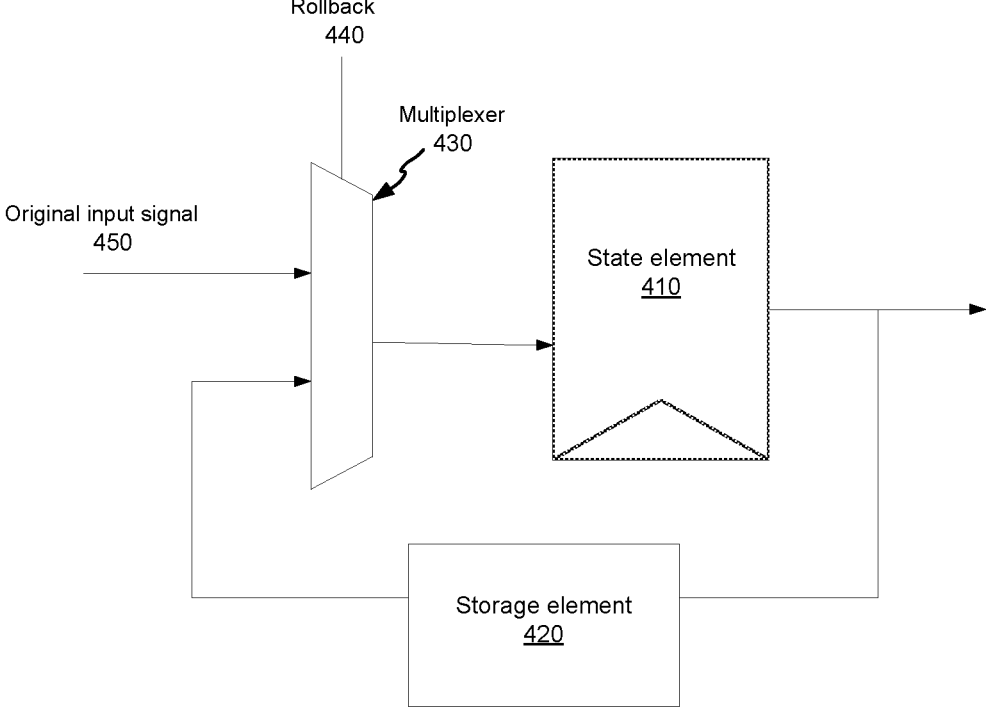
FIG. 4 illustrates an example of a circuit block diagram for implementing the storage element approach with various implementations of the disclosed technology.

FIG. 4 illustrates an example of a circuit block diagram for implementing the storage element approach with various implementations of the disclosed technology. The circuit block diagram shows a state element 410, a storage element 420 and a multiplexer 430. An input of the storage element 420 is coupled to the state element 410 for capturing the value stored in it. The storage element 420 then stores the captured value for a period which may be dependent on a signal like the global error signal 330 in FIG. 3. The rollback signal 440 also controls which signal, an original input signal 450 or an output signal from the storage element 420 will be supplied to an input of the state element 410. If a rollback is needed, the output signal from the storage element 440 will be selected. Otherwise, the original input signal 450 will be selected. The rollback signal 440 may be generated based on the signal like the global error signal 330 in FIG. 3.

Figure 5:
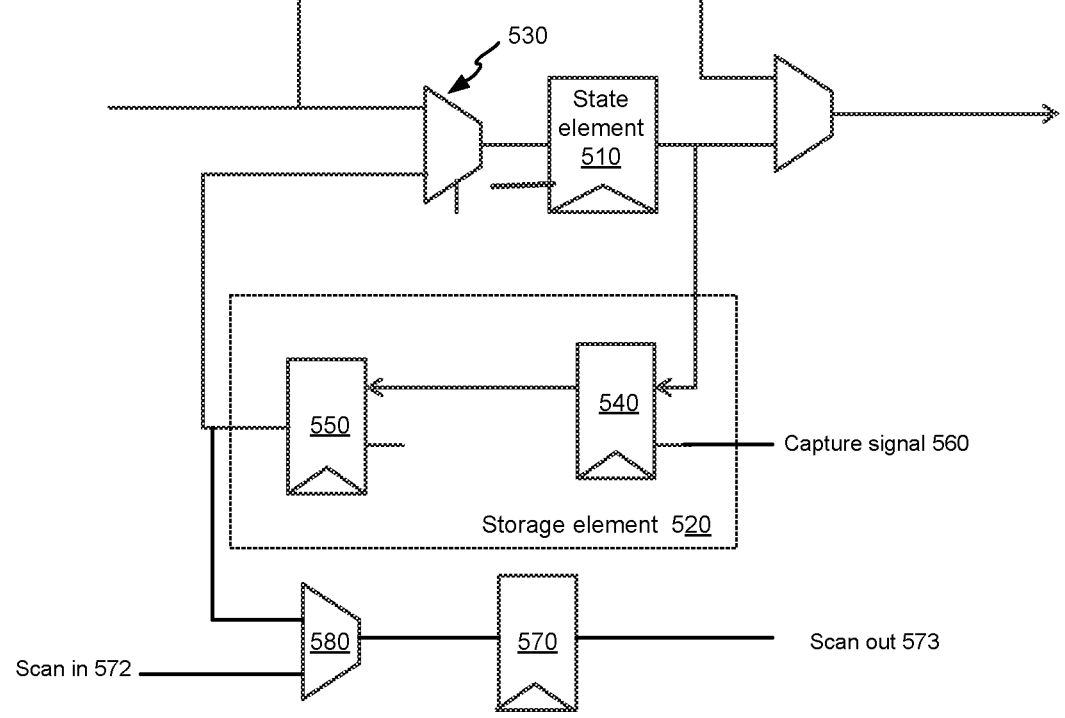
FIG. 5 illustrates another example of a circuit block diagram for implementing the storage element approach according to some embodiments of the disclosed technology.

FIG. 5 illustrates another example of a circuit block diagram for implementing the storage element approach according to some embodiments of the disclosed technology. Like FIG. 4, the circuit block diagram shows a state element 510, a storage element 520 and a multiplexer 530. Also shown in FIG. 5, the storage element 520 comprises two state elements 540 and 550. The state element 540 traces data at the output of the state element 510 based on a capture signal 560. The state element 540 serves as a shadow data register. The circuit may further comprise a scan element which can capture the output of the storage element 520 and shift it out. Also shown in the figure is scan circuitry comprising a state element 570 (a scan cell) and a multiplexer 580. The state element 570 is coupled to the output of storage element 520 through the multiplexer 580 and is coupled to other scan cells via scan in 572 and scan out 573 to form a scan chain. The scan chain can capture data stored in all of the storage elements and shift the data out for analysis.

Figure 6:
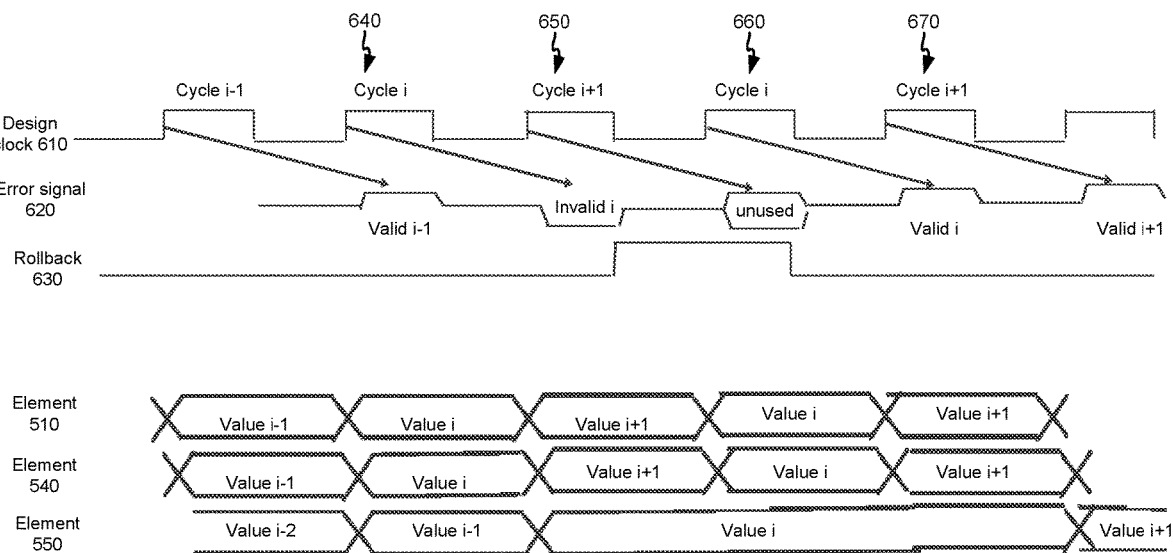
FIG. 6 illustrates an example of signal waveforms and state element value updating on rising edges for the circuit shown in FIG. 5 according to some embodiments of the disclosed technology.

FIG. 6 illustrates an example of signal waveforms and state element value updating on rising edges for the circuit shown in FIG. 5 according to some embodiments of the disclosed technology. The figure shows waveforms for a design clock 610, an error signal 620 generated by error monitoring circuitry and a rollback signal 630, and different data values stored (Value x) at different clock cycles in the state elements 510, 540 and 550. The rollback signal 630 may be the global error signal 330 in FIG. 3 or generated based on it. The error monitoring circuitry detects an error associated with data received at the first Cycle i (640), indicated at the first Cycle i+1 (650) by the error signal. Nevertheless, the state element 510 keeps updating from Value i to Value i+1 at the rising edge of the first Cycle i+1 (650), and the state element 540 keeps tracing the value of the state element 510. The state element 550 follows the state element 540 but delays by one design clock cycle. When the rollback signal 630 is enabled at the falling edge of the first Cycle i+1 (650), however, the state element 550 does not perform state updating and keeps Value i for another cycle, allowing Value i to be reinjected into the state element 510. As such, a rollback is performed at the second Cycle i (660). At the second Cycle i+1 (670), the state element 550 starts to follow the state element 540 again and gets the same Value i.

Figure 7:
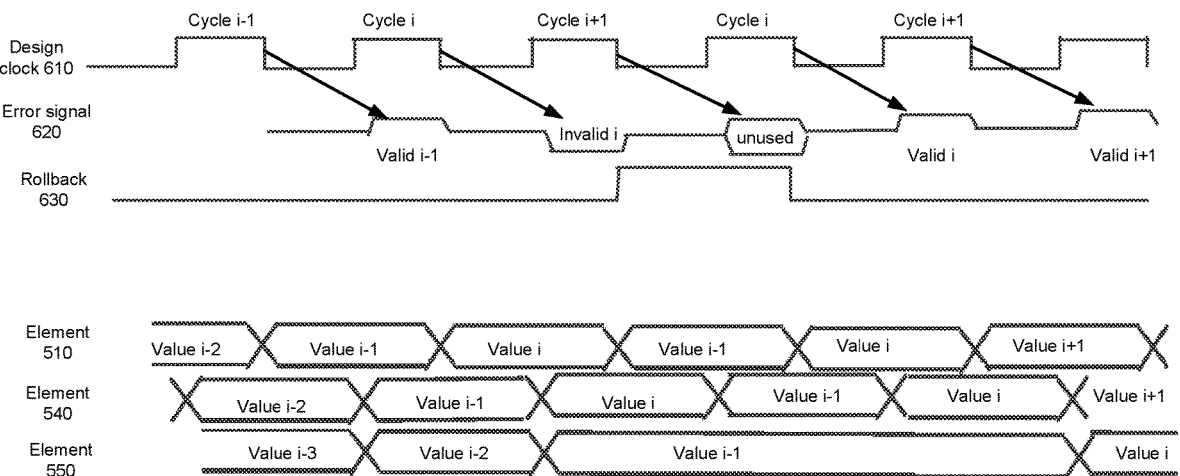
FIG. 7 illustrates an example of signal waveforms and state element value updating on falling edges for the circuit shown in FIG. 5 according to some embodiments of the disclosed technology.

FIG. 7 illustrates an example of signal waveforms and state element value updating on falling edges for the circuit shown in FIG. 5 according to some embodiments of the disclosed technology. The waveforms for the design clock 610, the error signal 620 and the rollback signal 630 are the same except for state updating for the state element 510 occurring at the falling edges rather than the rising edges. State updating for the state elements 540 and 550 still take place at the rising edges. Again, when the rollback signal 630 is enabled, the state element 550 does not perform state updating, allowing Value i to be injected back into the state element 510.

Figure 8:
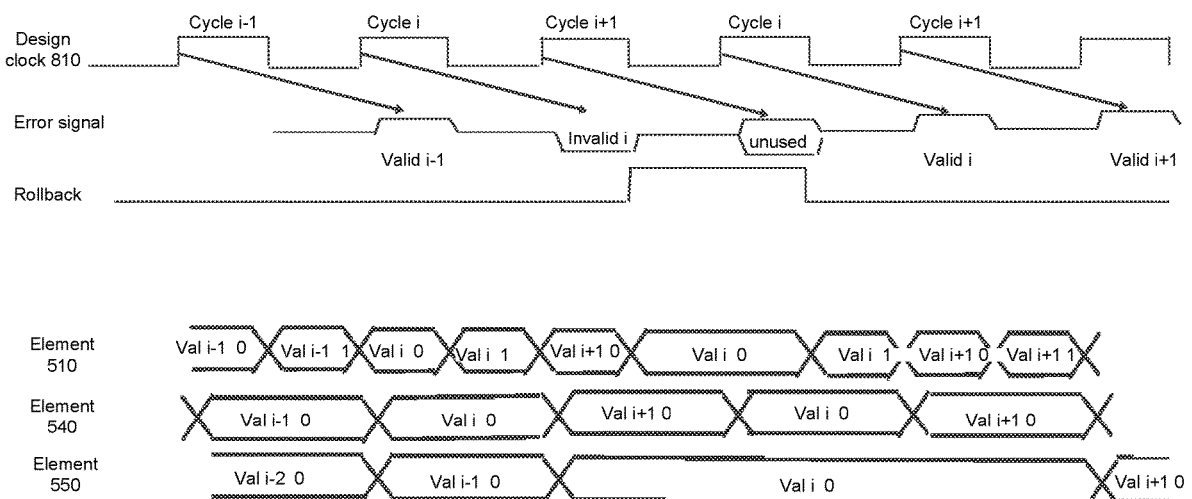
FIG. 8 illustrates an example of signal waveforms and state element value updating on both rising and falling edges for the circuit shown in FIG. 5 according to some embodiments of the disclosed technology.

FIG. 8 illustrates an example of signal waveforms and state element value updating on both rising and falling edges for the circuit shown in FIG. 5 according to some embodiments of the disclosed technology. Unlike FIGS. 6 and 7, state updating for the state element 510 happens twice per design clock cycle. However, state updating for the state elements 540 and 550 stay the same: occurring once per design clock cycle and only taking place at the rising edges. As a result, the state element 540 only traces the values of the state element 510 while the design clock 810 is at "1". No matter whether an error occurs at the rising edge of or the falling edge of a design clock cycle, the rollback operation always repeats the design verification operation from the rising edge.

Circuit designs typically contain memories which may be updated at a time not aligned to a clock edge. If a memory write address or write control signal is reached by data on a link with an error then the memory may be written with incorrect data even if the data has been corrected before the next clock edge. According to some embodiments of the disclosed technology, a write buffer can be added before memories. This write buffer temporarily stores write address and write data for any write which occurs. After a cycle, if the cycle is determined to be valid by the global error reduction/broadcast status, the address/data pairs in the write buffer are written to the memory. Or if after one cycle, the prior cycle is indicated to be invalid, the address/data pairs are discarded. Read operations may occur after write operations and thus may need to check for an address match with each element of the write buffer. In the event of a match, the read operation should use the data from the write buffer. If no match is found, then the read operation can take the value from the memory at the appropriate address.

FIG. 9 illustrates a flowchart 900 showing a process of communication link error recovery via rollback that may be implemented according to various examples of the disclosed technology. For ease of understanding, methods of communication link error recovery via rollback that may be employed according to various embodiments of the disclosed technology will be described with reference to the reconfigurable hardware modeling circuit 300 in FIG. 3 and the flow chart 900 illustrated in FIG. 9. It should be appreciated, however, that alternate implementations of a reconfigurable hardware modeling circuit may be used to perform the methods of communication link error recovery via rollback illustrated by the flow chart 900 according to various embodiments of the disclosed technology. Likewise, the reconfigurable hardware modeling circuit 300 may be employed to perform other methods of communication link error recovery via rollback according to various embodiments of the disclosed technology.

In operation 910, the error monitoring circuitry 320 in the reconfigurable hardware modeling circuit 300 in a reconfigurable hardware modeling device monitors whether data received from the communication ports 370 contains an error or not while the reconfigurable hardware modeling device is performing an operation for verifying a circuit design. In operation 920, the error monitoring circuitry 320 sends out an error signal indicating the monitoring result. In operation 930, the rollback circuitry 310 enables, if data received by any of the reconfigurable hardware modeling circuits (including the reconfigurable hardware modeling circuit 300) in the reconfigurable hardware modeling device contain an error, to repeat the operation from a state before the error is received. In operation 940, the reconfigurable hardware modeling device continues the operation if data received by the reconfigurable hardware modeling circuits contain no error.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A reconfigurable hardware modeling device comprising:

a plurality of reconfigurable hardware modeling circuits, each of the plurality of reconfigurable hardware modeling circuits comprising:

a plurality of communication ports, error monitoring circuitry configured to monitor, while the reconfigurable hardware modeling device is performing an operation for verifying a circuit design, whether data received from the plurality of communication ports contain an error or not, and send out an error signal indicating the monitoring result, wherein the monitoring operation performed by the error monitoring circuitry comprises:

determining, within one design clock cycle, whether data received from the plurality of communication ports at a rising edge, a falling edge, or both of the rising and falling edges of a design clock cycle immediately preceding the one design clock cycle contain an error or not, and generating the error signal within the one design clock cycle, and rollback circuitry configured to, if data received by any of the plurality of reconfigurable hardware modeling circuits contain an error, enable the each of the plurality of reconfigurable hardware modeling circuits to repeat the operation from a state before the error is received, wherein the enabling operation performed by the rollback circuitry includes suppressing state update of a state element, wherein the repeating operation rolls the operation for verifying the circuit design back to the rising edge of the design clock cycle immediately preceding the one design clock cycle, and if data received by the plurality of reconfigurable hardware modeling circuits contain no error, allow the each of the plurality of reconfigurable hardware modeling circuits to continue the operation.

2. The reconfigurable hardware modeling device recited in claim 1, wherein the reconfigurable hardware modeling device is configured to generate, based on the error signal, a global error signal indicating whether data received by any of the plurality of reconfigurable hardware modeling circuits contain an error or not, and to broadcast the global error signal to each of the plurality of reconfigurable hardware modeling circuits for the error recovery circuitry.

3. The reconfigurable hardware modeling device recited in claim 1, wherein the reconfigurable hardware modeling device is a processor-based emulator, and the plurality of reconfigurable hardware modeling circuits are Boolean processor circuits.

4. The reconfigurable hardware modeling device recited in claim 1, wherein the reconfigurable hardware modeling device is an FPGA-based emulator, and the plurality of reconfigurable hardware modeling circuits are commercial FPGA chips or custom-designed FPGA chips.

5. The reconfigurable hardware modeling device recited in claim 1, wherein a memory in each of the plurality of reconfigurable hardware modeling circuits has a write buffer configured to store data to be written in the memory along with an intended address of the memory.

6. The reconfigurable hardware modeling device recited in claim 5, wherein the write buffer is further configured to discard the data to be written in the memory along with the intended address of the memory if the data received by any of the plurality of reconfigurable hardware modeling circuits contain an error.

7. A reconfigurable hardware modeling device comprising:

a plurality of reconfigurable hardware modeling circuits, each of the plurality of reconfigurable hardware modeling circuits comprising:

a plurality of communication ports, error monitoring circuitry configured to monitor, while the reconfigurable hardware modeling device is performing an operation for verifying a circuit design, whether data received from the plurality of communication ports contain an error or not, and send out an error signal indicating the monitoring result, wherein the monitoring operation performed by the error monitoring circuitry comprises:

determining, within one design clock cycle, whether data received from the plurality of communication ports at a rising edge, a falling edge, or both of the rising and falling edges of a design clock cycle immediately preceding the one design clock cycle contain an error or not, and generating the error signal within the one design clock cycle, and rollback circuitry, the rollback circuitry comprising storage elements for state elements in the each of the plurality of reconfigurable hardware modeling circuits configured to capture and store values currently stored in the state elements before the state elements perform state updating wherein the rollback circuitry is configured to, if data received by any of the plurality of reconfigurable hardware modeling circuits contain an error, enable the each of the plurality of reconfigurable hardware modeling circuits to repeat the operation from a state before the error is received, wherein the enabling operation performed by the rollback circuitry includes transferring the value in the storage elements back to the state elements, wherein the repeating operation rolls the operation for verifying the circuit design back to the rising edge of the design clock cycle immediately preceding the one design clock cycle, and if data received by the plurality of reconfigurable hardware modeling circuits contain no error, allow the each of the plurality of reconfigurable hardware modeling circuits to continue the operation.

8. A method comprising:

monitoring, by error monitoring circuitry in each of a plurality of reconfigurable hardware modeling circuits in a reconfigurable hardware modeling device, whether data received from a plurality of communication ports in the each of the plurality of reconfigurable hardware modeling circuits contain an error or not while the reconfigurable hardware modeling device is performing an operation for verifying a circuit design, wherein the monitoring operation performed by the error monitoring circuitry comprises:

determining, within one design clock cycle, whether data received from the plurality of communication ports at a rising edge, a falling edge, or both of the rising and falling edges of a design clock cycle immediately preceding the one design clock cycle contain an error or not, and generating the error signal within the one design clock cycle;

sending out, by the error monitoring circuitry, an error signal indicating the monitoring result;

if data received by any of the plurality of reconfigurable hardware modeling circuits contain an error, enabling the each of the plurality of reconfigurable hardware modeling circuits by rollback circuitry in the each of the plurality of reconfigurable hardware modeling circuits to repeat the operation from a state before the error is received, including suppressing state update of a state element, wherein the repeating operation rolls the operation for verifying the circuit design back to the rising edge of the design clock cycle immediately preceding the one design clock cycle; and if data received by the plurality of reconfigurable hardware modeling circuits contain no error, continuing the operation by the reconfigurable hardware modeling device.

9. The method recited in claim 8, wherein the reconfigurable hardware modeling device is configured to generate, based on the error signal, a global error signal indicating whether data received by any of the plurality of reconfigurable hardware modeling circuits contain an error or not, and to broadcast the global error signal to each of the plurality of reconfigurable hardware modeling circuits for the error recovery circuitry.

10. The method recited in claim 8, wherein the reconfigurable hardware modeling device is a processor-based emulator, and the plurality of reconfigurable hardware modeling circuits are Boolean processors.

11. The method recited in claim 8, wherein the reconfigurable hardware modeling device is a FPGA-based emulator, and the plurality of reconfigurable hardware modeling circuits are commercial FPGA chips or custom-designed FPGA chips.

12. The method recited in claim 8, wherein a memory in each of the plurality of reconfigurable hardware modeling circuits has a write buffer configured to store data to be written in the memory along with an intended address of the memory.

13. The method recited in claim 12, wherein the write buffer is further configured to discard the data to be written in the memory along with the intended address of the memory if the data received by any of the plurality of reconfigurable hardware modeling circuits contain an error.

14. A method comprising:

monitoring, by error monitoring circuitry in each of a plurality of reconfigurable hardware modeling circuits in a reconfigurable hardware modeling device, whether data received from a plurality of communication ports in the each of the plurality of reconfigurable hardware modeling circuits contain an error or not while the reconfigurable hardware modeling device is performing an operation for verifying a circuit design, wherein the monitoring operation performed by the error monitoring circuitry comprises:

determining, within one design clock cycle, whether data received from the plurality of communication ports at a rising edge, a falling edge, or both of the rising and falling edges of a design clock cycle immediately preceding the one design clock cycle contain an error or not, and generating the error signal within the one design clock cycle;

sending out, by the error monitoring circuitry, an error signal indicating the monitoring result;

if data received by any of the plurality of reconfigurable hardware modeling circuits contain an error, enabling the each of the plurality of reconfigurable hardware modeling circuits by rollback circuitry in the each of the plurality of reconfigurable hardware modeling circuits to repeat the operation from a state before the error is received, wherein the rollback circuit comprises storage elements for state elements in the each of the plurality of reconfigurable hardware modeling circuits configured to capture and store values currently stored in the state elements before the state elements perform state updating, and wherein the enabling includes transferring the value in the storage elements back to the state elements, wherein the repeating operation rolls the operation for verifying the circuit design back to the rising edge of the design clock cycle immediately preceding the one design clock cycle; and if data received by the plurality of reconfigurable hardware modeling circuits contain no error, continuing the operation by the reconfigurable hardware modeling device.

* * * * *